(12) United States Patent
Ehrenberg

(10) Patent No.: US 9,293,269 B2
(45) Date of Patent: Mar. 22, 2016

(54) ULTRACAPACITOR TOLERATING ELECTRIC FIELD OF SUFFICIENT STRENGTH

(71) Applicant: Dais Analytic Corporation, Odessa, FL (US)

(72) Inventor: Scott G. Ehrenberg, Port Richey, FL (US)

(73) Assignee: Dais Analytic Corporation, Odessa, FL (US)

( * ) Notice: Subject to any disclaimer, the term of this patent is extended or adjusted under 35 U.S.C. 154(b) by 448 days.

(21) Appl. No.: 13/750,309

(22) Filed: Jan. 25, 2013

(65) Prior Publication Data

US 2014/0035540 A1 Feb. 6, 2014

Related U.S. Application Data

(60) Provisional application No. 61/596,535, filed on Feb. 8, 2012.

(51) Int. Cl.
| | |
|---|---|
| *H02J 7/00* | (2006.01) |
| *H01G 11/56* | (2013.01) |
| *H01G 11/04* | (2013.01) |
| *H01G 11/32* | (2013.01) |

(Continued)

(52) U.S. Cl.
CPC .............. *H01G 11/56* (2013.01); *H01G 11/04* (2013.01); *H01G 11/32* (2013.01); *H01G 11/36* (2013.01); *H01G 11/84* (2013.01); *H02J 7/00* (2013.01); *H02J 7/0021* (2013.01); *Y02E 60/13* (2013.01); *Y10T 29/417* (2015.01)

(58) Field of Classification Search
CPC ....... H01G 11/56; H01G 11/04; H01G 11/32; H01G 11/36; H01G 11/84; H02J 7/00; H02J 7/0021; Y10T 29/417; Y02E 60/13
See application file for complete search history.

(56) References Cited

U.S. PATENT DOCUMENTS

| | | | | |
|---|---|---|---|---|
| 4,224,121 A | * | 9/1980 | Dempsey et al. ............. | 205/521 |
| 4,248,821 A | | 2/1981 | Van Dellen | |
| 4,536,259 A | * | 8/1985 | Oda et al. ..................... | 205/238 |

(Continued)

FOREIGN PATENT DOCUMENTS

DE 580 366 7/1933

OTHER PUBLICATIONS

Gilbert, "The Reactions of Sulfur Trioxide, and of its Adducts, with Organic Compounds," *Chem. Rev.*, 1962; 62(6):549-589.

(Continued)

*Primary Examiner* — Naum B Levin
(74) *Attorney, Agent, or Firm* — Mueting, Raasch & Gebhardt, P.A.

(57) ABSTRACT

In one aspect, energy storage devices and methods are disclosed that include (preferably in order): a cationic electrode cover layer, a cationic electrode, a cationic exchange polymer electrolyte layer, a separation dielectric layer, an anionic exchange polymer electrolyte layer, an anionic electrode, and an anionic electrode cover layer. In certain embodiments, the device is configured to be initially placed in an ionized state, and optionally, can be configured to be further charged to store energy in an electrostatic mode. In another aspect, ionic solid dielectric materials, energy storage devices including ionic solid dielectric materials, and methods of making and using such materials and devices are disclosed herein.

16 Claims, 9 Drawing Sheets

Electrostatic Capacitor
Homogenous Dielectric

(51) Int. Cl.
*H01G 11/36* (2013.01)
*H01G 11/84* (2013.01)

(56) References Cited

U.S. PATENT DOCUMENTS

| | | | |
|---|---|---|---|
| 4,786,366 A * | 11/1988 | Ito et al. | 162/102 |
| 5,136,474 A | 8/1992 | Sarangapani et al. | |
| 5,239,010 A | 8/1993 | Balas et al. | |
| 5,468,574 A | 11/1995 | Ehrenberg et al. | |
| 5,677,074 A | 10/1997 | Serpico et al. | |
| 5,679,482 A | 10/1997 | Ehrenberg et al. | |
| 5,840,387 A | 11/1998 | Berlowitz-Tarrant et al. | |
| 6,110,616 A | 8/2000 | Sheikh-Ali et al. | |
| 6,383,391 B1 | 5/2002 | Ehrenberg et al. | |
| 6,413,298 B1 | 7/2002 | Wnek et al. | |
| 6,682,701 B1 * | 1/2004 | Liu et al. | 422/527 |
| 6,699,941 B1 | 3/2004 | Handlin et al. | |
| 6,841,601 B2 | 1/2005 | Serpico et al. | |
| 7,001,950 B2 | 2/2006 | Handlin, Jr. et al. | |
| 7,067,589 B2 | 6/2006 | Bening et al. | |
| 7,169,848 B2 | 1/2007 | Bening et al. | |
| 7,169,850 B2 | 1/2007 | Handlin, Jr. et al. | |
| 7,179,860 B2 | 2/2007 | Cao et al. | |
| 7,186,779 B2 | 3/2007 | Joly et al. | |
| 7,220,798 B2 | 5/2007 | Atwood et al. | |
| 7,569,281 B2 | 8/2009 | Umana et al. | |
| 7,618,826 B2 * | 11/2009 | Liu et al. | 436/161 |
| 7,737,224 B2 | 6/2010 | Willis et al. | |
| 7,813,106 B2 * | 10/2010 | Cai et al. | 361/502 |
| 7,990,679 B2 * | 8/2011 | Ehrenberg et al. | 361/502 |
| 8,003,209 B2 | 8/2011 | Flood et al. | |
| 8,027,150 B2 * | 9/2011 | Yamagishi et al. | 361/523 |
| 8,128,836 B2 * | 3/2012 | Kawahara et al. | 252/182.1 |
| 8,137,860 B2 * | 3/2012 | Yamashita et al. | 429/492 |
| 8,222,346 B2 | 7/2012 | Cao et al. | |
| 8,470,071 B2 | 6/2013 | Ehrenberg et al. | |
| 9,013,155 B2 * | 4/2015 | Ehrenberg | 320/167 |
| 2003/0106680 A1 | 6/2003 | Serpico et al. | |
| 2004/0238373 A1 * | 12/2004 | Kim et al. | 205/516 |
| 2007/0026251 A1 | 2/2007 | Umana | |
| 2007/0037927 A1 | 2/2007 | Yang | |
| 2007/0055015 A1 | 3/2007 | Flood et al. | |
| 2007/0108068 A1 * | 5/2007 | Suh et al. | 205/766 |
| 2007/0285875 A1 * | 12/2007 | Duff, Jr. | 361/502 |
| 2008/0057398 A1 * | 3/2008 | Wei et al. | 429/218.1 |
| 2008/0105551 A1 * | 5/2008 | Wang et al. | 204/627 |
| 2008/0218942 A1 * | 9/2008 | Yamagishi et al. | 361/525 |
| 2008/0316678 A1 * | 12/2008 | Ehrenberg et al. | 361/503 |
| 2009/0004550 A1 * | 1/2009 | McFarland et al. | 429/40 |
| 2009/0274944 A1 * | 11/2009 | Hasegawa et al. | 429/33 |
| 2010/0170776 A1 | 7/2010 | Ehrenberg et al. | |
| 2010/0273901 A1 | 10/2010 | Ehrenberg et al. | |
| 2011/0090620 A1 * | 4/2011 | Liu et al. | 361/500 |
| 2012/0320497 A1 | 12/2012 | Ehrenberg | |
| 2013/0165538 A1 | 6/2013 | Ehrenberg et al. | |

OTHER PUBLICATIONS

Jenkins et al., "Glossary of Basic Terms in Polymer Science," *Pure & Appl. Chem.*, 1996; 68(12):2287-2311.

Ring et al., "Source-based Nomenclature for Copolymers," *Pure & Appl. Chem.*, 1985; 57(10):1427-1440.

* cited by examiner

ULTRACAPACITOR TOLERATING ELECTRIC FIELD OF SUFFICIENT STRENGTH

This application claims the benefit of U.S. Provisional Application No. 61/596,535, filed Feb. 8, 2012, which is hereby incorporated by reference in its entirety.

BACKGROUND

Electrical energy storage devices, such as capacitors, batteries, and ultracapacitors, store or create energy by utilizing the electric charge on two metal or otherwise electrically conductive surfaces ("electrodes"). The charge-bearing surfaces are typically separated by an electrical insulator, or dielectric. As charge is placed on the conductive surfaces, an electrical field is established between the electrodes, resulting in a voltage. Typically, a capacitor physically separates positive and negative charges, rather than chemically separating the charges, as is common in batteries. Batteries have limited ability to be recycled and cannot deliver energy as quickly as a capacitor, or without greater losses than occurs with capacitors.

A supercapacitor or ultracapacitor is sometimes called a double-layer capacitor, as it polarizes an electrolytic solution to store energy electrostatically. The energy storage mechanism of an ultracapacitor is highly reversible, which allows for the ultracapacitor to be charged and discharged many times.

However, capacitors typically have not been able to match the energy storage capability of batteries due to the lack of available materials and structures that can tolerate electric fields of sufficient strength.

SUMMARY

The present disclosure provides various embodiments of energy storage devices, and methods of making and using same.

In one embodiment, the energy storage device includes (preferably in order): a cationic electrode cover layer, a cationic electrode, a cationic exchange polymer electrolyte layer, a separation dielectric layer, an anionic exchange polymer electrolyte layer, an anionic electrode, and an anionic electrode cover layer. In certain embodiments, the device further includes a non-electrically conductive dielectric oil (e.g., a polydimethylsiloxane), preferably within one or more solid electrolyte layers. Optionally, the device can include a conductive layer (e.g., a conductive paint such as a carbon conductive paint) between an electrode and the electrolyte. In certain embodiments, the device is configured to be initially placed in an ionized state, and optionally, can be configured to be further charged to store energy in an electrostatic mode.

The cationic exchange polymer electrolyte layer includes at least one polymer having a plurality of chemically bound negative ions and a plurality of electrostatically bound positive ions (e.g., hydrogen ions, $H^+$). The cationic electrode cover layer, preferably including an insulating material, is configured to provide a gas tight seal around the cationic exchange polymer electrolyte layer and the cationic electrode to exposed portions of the separation dielectric layer. The cationic electrode cover layer also includes a first optional vacuum port and a first electrical contact in electrical communication with the cationic electrode. Optionally, the first vacuum port can include, for example, an electrically conductive metal, in which case, the first vacuum port can also be the first electrical contact.

The anionic exchange polymer electrolyte layer includes at least one polymer having a plurality of chemically bound positive ions and a plurality of electrostatically bound negative ions (e.g., chloride ions, $Cl^-$). The anionic electrode cover layer, preferably including an insulating material, is configured to provide a gas tight seal around the anionic exchange polymer electrolyte layer and the anionic electrode to exposed portions of the separation dielectric layer. The anionic electrode cover layer also includes a second optional vacuum port and a second electrical contact in electrical communication with the anionic electrode. Optionally, the second vacuum port can include, for example, an electrically conductive metal, in which case, the second vacuum port can also be the second electrical contact.

The present disclosure further provides methods for placing such an energy storage device in an ionized state. In one embodiment, the method includes: providing an energy storage device as described herein; applying a negative potential to the first electrical contact of the cationic electrode cover layer effective to cause at least a portion (and preferably substantially all) of the electrostatically bound positive ions (e.g., hydrogen ions, $H^+$) to migrate to the cationic electrode and be reduced to a neutral species (e.g., molecular hydrogen, $H_2$); applying a positive potential to the second electrical contact of the anionic electrode cover layer effective to cause at least a portion (and preferably substantially all) of the electrostatically bound negative ions (e.g., chloride ions, $Cl^-$) to migrate to the anionic electrode and be oxidized to a neutral species (e.g., molecular chlorine, $Cl_2$); optionally applying at least a partial vacuum (and preferably a vacuum) to the first optional vacuum port of the cationic electrode cover layer effective to remove at least a portion (and preferably substantially all) of the reduced neutral species; and optionally applying at least a partial vacuum (and preferably a vacuum) to the second optional vacuum port of the anionic electrode cover layer effective to remove at least a portion (and preferably substantially all) of the oxidized neutral species. Such energy storage devices in the ionized state can be in an uncharged state and in an electrically neutral state having no potential across the first and second electrical contacts, resulting in the device having a high dielectric constant, and wherein the anionic exchange polymer electrolyte layer and the cationic exchange polymer electrolyte layer of the energy storage device in the ionized state can be under compressive strain.

The present disclosure also provides methods of storing energy using an energy storage device in an ionized state as described herein. In certain embodiments, the method includes applying a positive potential to the first electrical contact of the cationic electrode cover layer and negative potential to the second electrical contact of the anionic electrode cover layer under conditions effective to electrostatically store charge on the device. In certain embodiments, the storage of charge on the device is sufficient to at least partially relieve (and preferably fully relieve) compressive strain between the anionic exchange polymer electrolyte layer and the cationic exchange polymer electrolyte layer.

In another embodiment, the present disclosure provides a method of preparing an ionic solid dielectric material. The method can include: providing an anionic exchange polymer electrolyte solution including at least one polymer having a plurality of chemically bound positive ions and a plurality of electrostatically bound negative ions (e.g., chloride ions); providing a cationic exchange polymer electrolyte solution including at least one polymer having a plurality of chemically bound negative ions and a plurality of electrostatically bound positive ions (e.g., hydrogen ions); combining the anionic exchange polymer electrolyte solution and the cationic exchange polymer electrolyte solution under conditions effective to allow at least a portion of the plurality of chemically bound positive ions of the anionic exchange polymer electrolyte to ionically associate with at least a portion of the plurality of chemically bound negative ions of the cationic exchange polymer electrolyte and form the ionic solid dielectric material. In certain embodiments, the formed ionic solid dielectric material can be cast as a film on a substrate (e.g., a release substrate or a conductive plate).

In certain embodiments, the film of the formed ionic solid dielectric material further can include at least a portion of the negative ions that were electrostatically bound to the anionic exchange polymer electrolyte, and at least a portion of the positive ions that were electrostatically bound to the cationic exchange polymer electrolyte. In such embodiments, at least a portion of the negative and/or positive ions from the ionic solid dielectric film can optionally be removed by washing the film with, for example, deionized, distilled water.

In another aspect, the present disclosure provides an ionic solid dielectric material. In one embodiment, the ionic solid dielectric material includes: at least one polymer having a plurality of chemically bound positive ions; and at least one polymer having a plurality of chemically bound negative ions, wherein at least a portion of the plurality of chemically bound positive ions are ionically associated with at least a portion of the plurality of chemically bound negative ions. As used herein, "ionically associated with" means that the chemically bound positive ions and the chemically bound negative ions are sufficiently associated in solution such that at least a portion, and preferably all, of any electrostatically bound positive and negative ions can be removed. In certain embodiments, the present disclosure provides ionic solid dielectric materials prepared by methods disclosed herein.

In another aspect, the present disclosure provides an energy storage device that includes: a first conductive plate; a second conductive plate; and at least one ionic solid dielectric layer between the first conductive plate and the second conductive plate. Optionally, the device can include a conductive layer (e.g., a conductive paint such as a carbon conductive paint) between a conductive plate and the at least one ionic solid dielectric layer. In some embodiments, the at least one ionic solid dielectric layer includes an ionic solid dielectric material as described herein. In some embodiments, at least one conductive plate includes a metal or carbon conductive plate such as a porous metal or carbon plate (e.g., a carbon composite electrode). For example, the conductive plate can be selected from the group consisting of a metal conductive plate, a carbon conductive plate, a porous metal conductive plate, a porous carbon conductive plate, and a carbon composite electrode. In certain embodiments, the device can optionally include a non-electrically conductive dielectric oil (e.g. polydimethylsiloxane), for example, at least partially within the at least one ionic solid dielectric layer. In certain embodiments, the device is configured to be charged to store energy in an electrostatic mode.

In another aspect, the present disclosure provides a method of storing energy. In certain embodiments, the method includes: providing an energy storage device that includes a first conductive plate, a second conductive plate, and at least one ionic solid dielectric layer between the first conductive plate and the second conductive plate; and applying a field negatively polarized with respect to the first conductive plate and positively polarized with respect to the second conductive plate under conditions effective to electrostatically store charge on the device. In some embodiments, conditions effective to store charge on the device include applying a field having a potential of at least 1 volt direct current, and in certain embodiments a potential of greater than 1 volt direct current. In certain embodiments, conditions effective to store charge on the device include applying a field having a potential of no greater than the breakdown voltage of the ionic solid dielectric layer.

In another aspect, the present disclosure provides systems for storing and discharging energy that include one or more energy storage devices as disclosed herein; and a means for applying a field negatively polarized with respect to the first conductive plate and positively polarized with respect to the second conductive plate under conditions effective to electrostatically store charge on the device (e.g., using a current source such as a direct current source, which can optionally be a continuous current source); and a means for discharging energy from electrostatically stored charge on the device (e.g., using a resistive and/or mechanical drain, such as heaters and/or motors).

In another aspect, the present disclosure provides cells and cell packs that include one or more an energy storage devices as described herein.

As used herein, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

The above brief description of various embodiments of the present disclosure is not intended to describe each embodiment or every implementation of the present disclosure. Rather, a more complete understanding of the disclosure will become apparent and appreciated by reference to the following description and claims in view of the accompanying drawing. Further, it is to be understood that other embodiments may be utilized and structural changes may be made without departing from the scope of the present disclosure.

DETAILED DESCRIPTION OF ILLUSTRATIVE EMBODIMENTS

Capacitors typically store charge on electrically conductive surfaces. These charge-bearing surfaces are separated by a dielectric; an electrical insulator with a bulk resistance greater than $10^6$ ohm-cm. As a charge is placed on the material surfaces, an electrical field is established between the plates resulting in a voltage. The net charge stored within the capacitor is always zero.

Charge can be added to the plates until the electric field becomes so strong that it breaks down the dielectric. One measure of the performance of a dielectric material is its permittivity, i.e., its capacitance per unit length. The higher the permittivity, the slower the electric field will build for a given amount of charge. The other measure of the performance of a dielectric is breakdown voltage, i.e., the electric field strength that can cause the dielectric to rupture (reported in volts per unit thickness of the dielectric).

An additional concept can be considered for the materials and devices disclosed herein. The dielectric constant, Epsilon Relative, $E_r$, for these materials is not a constant, but a function of voltage. Due to the configuration of charges within the polymer electrolyte, as the plate voltage of the capacitor increases, the dielectric constant will also increase. This effect can be explained by the ionic spacing of the charges along the polymer molecules of the electrolyte. As the plate electric field increases, the spaces between the charges also increases. As the space increases, the attractive force between the charges decreases by $1/distance^2$. The decrease in polymer charge attractive force makes polarization to the plate electric field easier which is, by definition, an increase in the dielectric constant.

While a battery stores energy as a chemical potential, a capacitor stores energy in an electric field created by charge on the plates. A capacitor typically can accept and deliver energy faster and with less loss than a battery. This makes capacitors more efficient and potentially more powerful than batteries.

The electrical and performance characteristics of a capacitor are generally described by three simple equations:

Charge=Capacitance×Voltage

Capacitance=(Permittivity of the dielectric×$A$)/$d$

Stored Energy=½ Capacitance×Voltage$^2$

Figure 1:
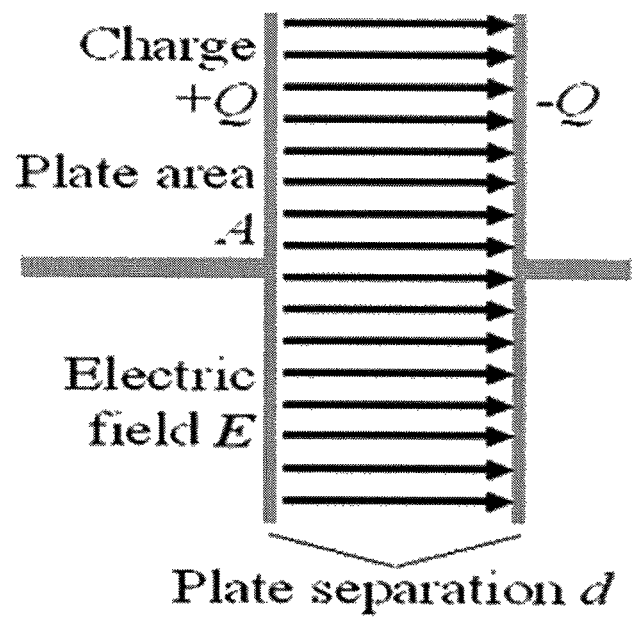
FIG. 1 is a schematic illustration of a simple capacitor.

Referring to FIG. 1, A is the surface area of the electrodes, d is the space between the electrodes, and Q is the charge stored on the plates when an electric field of E is applied to the plates. These equations indicate that capacitance can be increased by increasing the plate area, increasing the permittivity of the dielectric, and/or decreasing the separation between the plates. Further, increasing the voltage on the capacitor has an exponential effect on the energy stored within the device.

Capacitors have the ability to be cycled thousands of times due to the lack of internal electrochemical reactions. However, capacitors typically have not been able to match the energy storage capability of a battery due to lack of available materials and structures that can tolerate electric fields having sufficient strength.

The term "ultracapacitor" has been given to capacitors that begin to approach the energy storage capability of a battery. However, material and structural constraints have limited state-of-the-art ultracapacitors to an energy storage capacity approximately 25 times less than a similarly sized lithium-ion battery.

Existing ultracapacitor offerings are based around the electric double layer capacitor (EDLC) principle. In EDLC, a high surface area porous electrode, typically made from carbon, is placed on either side of a dielectric barrier. These electrodes have surface area to weight ratios of 1000 to 2300 meters$^2$ per gram. A liquid electrolyte solution is injected into the porous structure, coating the surface. The solution contains dissolved electrolyte salts suspended in an organic solvent.

Figure 2:
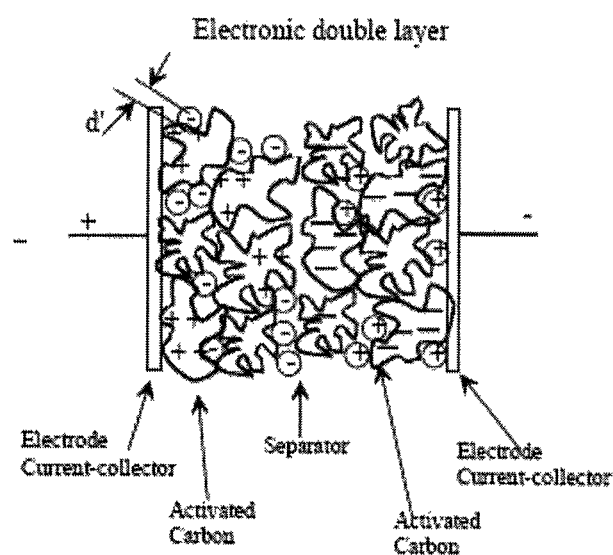
FIG. 2 is a schematic illustration of an electric double layer capacitor (EDLC) structure.

During operation, when charge is present on the capacitor, the electrolyte salts respond to the electric field created by the charge and align along the porous surface of the electrode. This alignment creates a counter electric field which minimizes the net capacitor voltage, allowing the addition of more electrical charge. Since the charge separation is very small (10 Angstroms-100 Angstroms) the resulting capacitances of the structure are very high. Typical cells can have capacitances of 1500 to 3500 farads (F). The structure of the EDLC is shown in FIG. 2. FIG. 2 illustrates two high surface area porous electrodes separated by a separator, and each including a current collector and activated carbon. FIG. 2 shows the alignment of electrolyte ions along the porous surface of each electrode, and the small separation of charges (d) resulting from the electric field when a charge is applied to the cell.

The electrolyte solution enables extremely high capacitances but limits the voltage that can be applied to the cell. Organic solvents employed for the electrolyte solution typically break down at 3 volts (e.g., direct current). For safety, typical EDLC voltages are typically limited to 2.7 volts (e.g., direct current).

In certain embodiments, the devices, methods, and systems disclosed herein can overcome at least some of these constraints by using, among other things, materials that have the required permittivity and breakdown voltage to store, charge, and discharge energy, preferably at performance levels equivalent or superior to the best lithium ion batteries.

The present disclosure provides various embodiments of energy storage devices, and methods of making and using same.

In one embodiment, the energy storage device includes (preferably in order): a cationic electrode cover layer, a cationic electrode, a cationic exchange polymer electrolyte layer, a separation dielectric layer, an anionic exchange polymer electrolyte layer, an anionic electrode, and an anionic electrode cover layer. In certain embodiments, the device further includes a non-electrically conductive dielectric oil (e.g., a polydimethylsiloxane), preferably within one or more solid electrolyte layers. In certain embodiments, the device is configured to be initially placed in an ionized state, and optionally, can be configured to be further charged to store energy in an electrostatic mode. In preferred embodiments the dielectric is desiccated to improve performance.

The separation dielectric layer has at least a first major surface and a second major surface and can function as an ion barrier layer. The separation dielectric layer can be made of a wide variety of materials including polymers such as, for example, polyesters (e.g., polyethylene terephthalate), fluorocarbon polymers (e.g., polytetrafluoroethylene), and vinyl polymers (e.g., polyvinyl chloride). Preferred properties of this layer are one or more of (i) a substantially high electronic resistance (e.g., greater than $10^{14}$ Ohm-cm); (ii) no or substantially no ionic conductivity; and (iii) a high dielectric strength (e.g., greater than 15 kV/mm).

The cationic exchange polymer electrolyte layer has at least a first major surface and a second major surface. The first major surface of the cationic exchange polymer electrolyte layer is adjacent a portion of the first major surface of the separation dielectric layer. The cationic exchange polymer electrolyte layer includes at least one polymer having a plurality of chemically bound negative ions and a plurality of electrostatically bound positive ions (e.g., hydrogen ions, $H^+$).

A wide variety of cationic exchange polymer electrolytes can be used in the devices, methods, and systems disclosed herein. Exemplary chemically bound negative ions include sulfonate, carboxylate, phosphate, phosphonate, and combinations thereof. Exemplary electrostatically bound positive ions include, for example, alkali metal ions (e.g., lithium, sodium, potassium, rubidium, and/or cesium), alkaline earth metal ions (e.g., calcium, strontium, and/or barium), and combinations thereof. In certain embodiments, the cationic exchange polymer electrolyte layer can include an optionally crosslinked cationic exchange polymer (e.g., a sodium cationic exchange polymer).

In certain embodiments, the cationic exchange polymer electrolyte can be a polystyrene having sulfonate groups attached to the aromatic ring (e.g., in the ortho and/or para positions) of at least a portion of the styrene units. For example, polymers having pendant aryl sulfonate groups are described, for example, in U.S. Pat. No. 5,468,574 (Ehrenberg et al.), U.S. Pat. No. 5,677,074 (Serpico et al.), U.S. Pat. No. 5,679,482 (Ehrenberg et al.), U.S. Pat. No. 5,840,387 (Berlowitz-Tarrant et al.), U.S. Pat. No. 6,110,616 (Sheikh-Ali et al.), U.S. Pat. No. 6,383,391 Ehrenberg et al.), U.S. Pat. No. 6,413,298 (Wnek et al.), U.S. Pat. No. 6,841,601 (Serpico et al.), U.S. Pat. No. 7,179,860 (Cao et al.), and U.S. Pat. No. 7,990,679 (Ehrenberg et al.); and U.S. Patent Application Publication No. 2012/0320497 (Ehrenberg).

The anionic exchange polymer electrolyte layer has at least a first major surface and a second major surface. The first major surface of the cationic exchange polymer electrolyte layer is adjacent a portion of the second major surface of the separation dielectric layer. The anionic exchange polymer electrolyte layer includes at least one polymer having a plurality of chemically bound positive ions and a plurality of electrostatically bound negative ions (e.g., chloride ions, $Cl^-$).

A wide variety of anionic exchange polymer electrolytes can be used in the devices, methods, and systems disclosed herein. Exemplary chemically bound positive ions include ammonium (e.g., quaternary ammonium), phosphonium (e.g., quaternary phosphonium), sulfonium (e.g., tertiary sulfonium), and combinations thereof. Exemplary electrostatically bound negative ions include, for example, halides (e.g., chloride, fluoride, bromide, and/or iodide), pseudohalides (e.g., azides, isocyanides), $SbF_6^-$, $PF_6^-$, and combinations thereof. In certain embodiments, the anionic exchange polymer electrolyte layer can include an optionally crosslinked anionic exchange polymer (e.g., an iodide anionic exchange polymer).

In certain embodiments, the anionic exchange polymer electrolyte can be a polystyrene having $-CH_2NR_3^+X^-$ groups attached to the aromatic ring (e.g., in the ortho and/or para positions) of at least a portion of the styrene units, wherein each R can independently represent a C1-C10 alkyl group, and X can represent a halide. A particularly preferred anionic exchange polymer electrolyte can be a polystyrene having $-CH_2N(CH_3)_3^+I^-$ groups attached to the aromatic ring of at least a portion of the styrene units, which can conveniently be prepared by aminating a chloromethylated polystyrene with a tertiary amine, and exchanging chloride for iodide.

The general structures of the polymers used for the anionic and cationic exchange polymer electrolytes can be the same or different. As used herein, the term "polymers" is intended to be broadly interpreted to include, for example, oligomers. In certain embodiments, polymers having the same general structure can be modified through chemical reactions (e.g., sulfonations) or substitution reactions of the polymers and/or the monomers used to prepare the polymers, to become anionic and/or cationic polymer exchange electrolytes. In certain embodiments, the general structure of the polymers can result in self assembly properties that can create nanostructure that can be important for ionic conduction and charge separation.

For embodiments in which the exchange polymer electrolyte is sulfonated, the polymer to be sulfonated can have a high styrenic content and/or a controlled distribution of carbon-carbon double bonds. In certain embodiments, the exchange polymer electrolyte can be a highly sulfonated polymer composite. For embodiments in which the exchange polymer electrolyte is sulfonated, the polymer can be highly uniformly sulfonated (i.e. from about 25-100% sulfonated by weight), and may be utilized in the form of a sulfonated sheet or membrane. Processes for sulfonating polymers are described, for example, in Gilbert, Chem Rev (1962) 62:549-589; and German Patent No. DE 580,366.

The sulfonated polymers described herein cam be sulfonated by a wide variety of methods. Sulfonation generally refers to an organic chemical reaction that leads to the formation of a carbon-sulfur bond. When the reacting compound contains an aromatic ring, sulfonation at the aromatic ring by the reactive (sulfonating) compound usually occurs by replacing a hydrogen atom on the aromatic ring by a sulfonic acid residue functional group by means of an electrophilic aromatic substitution reaction. Sulfonated block copolymers may be produced by sulfonation reaction using, for example, sulfur trioxide, sulfuric acid, chlorosulfonic acid, and/or acetyl sulfate as the sulfonating agent. The sulfonated polymers could be used in their produced form, or in their acid, alkali metal salt, or ammonium salt (including complex amine) forms.

In certain embodiments, the anionic and/or cationic exchange polymer electrolytes can include, for example, peptides, polypeptides, proteins, glycoproteins, biopolymers, and combinations thereof. In certain embodiments, the anionic and/or cationic exchange polymer electrolytes can include, for example, homopolymers and/or copolymers (e.g., a statistical, random, or block copolymer). In other certain embodiments, the anionic and/or cationic exchange polymer electrolytes can include, for example, single or multiphase polymers and/or copolymers. In certain embodiments, the anionic and/or cationic exchange polymer electrolytes can include, for example, an ionomer.

In general, ionomers contain both polar and non-polar moieties, which each group together. The polar ionic moieties tend to cluster together and separate from the nonpolar backbone moieties, which allows for thermoplasticity, especially when heated. This increased thermoplasticity allows for increased energy storage and increased ability to cycle. Additionally, the non-ionic areas can exhibit adhesive properties. In certain embodiments, a balance between thermoplasticity and flow at a certain temperature can be desirable.

In certain embodiments, the anionic and/or cationic exchange polymer electrolytes can include, for example, arene-containing linear side chains, non-arene-containing linear side chains, saturated linear side chains, unsaturated linear side chains, and flexible hydrocarbon linear side chains. In certain embodiments, the anionic and/or cationic exchange polymer electrolytes can be, for example, unsubstituted and/or substituted (e.g., substituted with heteroatoms such as oxygen, nitrogen, or other non-carbon atoms). In certain embodiments, the anionic and/or cationic exchange polymer electrolytes can are capable of being dissolved in chlorinated solvents, and may stay in solution at cold temperatures.

As used herein, an "alkene moiety" refers to a hydrocarbon chain containing at least one carbon-carbon double bond. An "arene moiety" refers to a monovalent or divalent aryl or heteroaryl group. An aryl group refers to hydrocarbon ring system including hydrogen, 6 to 18 carbon atoms, and at least one aromatic ring. The aryl group may be a monocyclic or polycyclic (e.g., bicyclic, tricyclic, or tetracyclic) ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5 to 14 membered ring system including hydrogen atoms, one to thirteen carbon atoms, one to six heteroatoms (e.g., nitrogen, oxygen, and/or sulfur), and at least one aromatic ring. The heteroaryl group may be a monocyclic or polycyclic (e.g., bicyclic, tricyclic, or tetracyclic) ring system, which may include fused or bridged ring systems. The nitrogen, carbon, and/or sulfur atoms in the heteroaryl radical may optionally be oxidized, and the nitrogen atom may optionally be quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

As used herein, an "arene-containing linear side chain" refers to an unbranched hydrocarbon chain consisting only of carbon and/or hydrogen, wherein at least one carbon in the chain is replaced with an aryl or heteroaryl group, as defined above.

As used herein, a "non-arene-containing linear side chain" refers to an unbranched hydrocarbon chain consisting only of carbon and/or hydrogen and containing no aryl or heteroaryl groups within the chain.

As used herein, an "unsaturated linear side chain" refers to an unbranched hydrocarbon chain consisting only of carbon and/or hydrogen and including at least one carbon-carbon double bond or at least one carbon-carbon triple bond. As used herein, a "saturated linear side chain" refers to an unbranched hydrocarbon chain consisting only of carbon and/or hydrogen and containing no carbon-carbon double bonds and no carbon-carbon triple bonds.

As used herein, a "flexible hydrocarbon linear side chain" refers to a flexible connecting component as disclosed, for example, in U.S. Pat. No. 5,468,574 (Ehrenberg et al.) and U.S. Pat. No. 5,679,482 (Ehrenberg et al.).

Various types of copolymers, including block copolymers, exist that may be used with certain embodiments disclosed herein. For example, alternating copolymers include regular alternating A and B chemical or constitutional units; periodic copolymers contain A and B units arranged in a repeating sequence (e.g., (A-B-A-B-B-A-A-A-B-B)n); random copolymers including random sequences of monomer A and monomer B units; statistical copolymers including an ordering of distinct monomers within the polymer sequence that obeys statistical rules; block copolymers that include two or more homopolymer subunits linked by covalent bonds such as, for example, diblock, tri-block, tetra-block or other multi-block copolymers. See, for example, IUPAC, Pure Appl Chem (1996) 68:2287-2311.

Additionally, any of the copolymers described may be linear (including a single main chain), or branched (including a single main chain with one or more polymeric side chains). Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush, and comb copolymers. Any one of these copolymers, or any mixture thereof, may be utilized with certain aspects of the disclosed devices.

In certain embodiments, the anionic and/or cationic exchange polymer electrolytes can include, for example, a polymer including at least one block. In certain embodiments, the polymer is a thermoplastic block copolymer. In other embodiments, the polymer is a block copolymer that includes differentiable monomeric units. Preferably, at least one of the monomeric units of the block copolymer includes an arene moiety-containing unit. In other preferred embodiments, at least one block includes a non-arene moiety-containing unit. In certain embodiments, the block copolymer includes at least two monomeric units arranged in statistically random order. In other embodiments, the block copolymer includes at least two monomeric units arranged in ordered sequence. In certain embodiments, the anionic and/or cationic exchange polymer electrolytes can include, for example, not only polymers or block copolymers, but also copolymers with other ethylenically unsaturated monomers (e.g., acrylonitrile, butadiene, methyl methacrylate, and combinations thereof).

In certain embodiments, a block copolymer can be a block copolymer having at least a first block of one or more mono alkene-arene moieties, such as styrene, ring-substituted styrene, α-substituted styrene, or any combination thereof; and a second block of a controlled distribution copolymer of a diene moiety and a mono alkene-arene moiety. The block copolymer can be any configuration of "A" and "B" blocks, and such block copolymers can be generated by a wide variety of methods known to one of skill in the art.

As used herein, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain including two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include, for example, those described in U.S. Pat. No. 4,248,821 (Van Dellen), U.S. Pat. No. 5,239,010 (Balas et al.), U.S. Pat. No. 6,699,941 (Handlin et al.), U.S. Pat. No. 7,001,950 (Handlin, Jr. et al.), U.S. Pat. No. 7,067,589 (Bening et al.), U.S. Pat. No. 7,169,848 (Bening et al.), U.S. Pat. No. 7,169,850 (Handlin, Jr. et al.), U.S. Pat. No. 7,186,779 (Joly et al.), U.S. Pat. No. 7,220,798 (Atwood et al.), U.S. Pat. No. 7,569,281 (Umana et al.), U.S. Pat. No. 7,737,224 (Willis et al.), and U.S. Pat. No. 8,003,209 (Flood et al.); and U.S. Patent Application Publication Nos. 2007/0026251 (Umana), 2007/0037927 (Yang), and 2007/0055015 (Flood et al.).

In certain embodiments, the anionic and/or cationic exchange polymer electrolytes can include, for example, a statistical copolymer. A statistical copolymer is used herein consistent with the commonly understood usage in the art. See, for example, Odian, Principles of Polymerization, 1991. Statistical copolymers can be derived from the simultaneous polymerization of two monomers and can have, for example, a distribution of the two monomeric units along the copolymer chain, which follows Bernoullian (zero-order Markov), or first or second order Markov statistics. The polymerization may be initiated by free radical, anionic, cationic, or coordinatively unsaturated (e.g., Ziegler-Natta catalysts) species. According to Ring et al., (Pure Appl Chem (1985) 57:1427), statistical copolymers can be the result of elementary processes leading to the formation of a statistical sequence of monomeric units that do not necessarily proceed with equal probability.

These processes can lead to various types of sequence distributions including those in which the arrangement of monomeric units tends toward alternation, tends toward clustering of like units, or exhibits no ordering tendency at all. Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In some cases block copolymers can be derived from the simultaneous copolymerization of two monomers when the preference of the propagating chain ends for adding the opposite monomers is very low. The resulting polymer would be categorized as a block copolymer for the purposes of the present disclosure.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains. It should be noted that membranes which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the present disclosure.

Pseudo-random copolymers are a subclass of statistical copolymers which result from a weighted change in the monomer incorporation that skews the distribution from a random arrangement (i.e. Bernoullian) that is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units including diblock, triblock, graft-block, multiarm starblock, multiblock, segmented, tapered block, or any combination thereof.

In certain such embodiments, the polymer includes moieties or segments including unsaturated carbon-carbon double bonds, which are able to be sulfonated. Some examples of such polymers include, but are not limited to, polybutadiene and/or polyisoprene.

In particular, certain embodiments disclosed herein relate to the sulfonation of polymers including one or more of the following moieties: alkane, alkene, alkyne, and arene, each of which may be optionally substituted by one or more of the following functional groups: carboxylic acid, urea, ester, urethane (carbamate), alkene, amide, benzene, pyridine, indole, carbonate, thioester, arcylate/acrylic, ether, amidine, ethyl, acid versions of aliphatic compounds that contain alkenes, alkanes or alkynes, imidazole, oxazole, and other possible combinations of heteroatom containing groups susceptible to loss of water and/or disassembly. Each of the terms listed above has its standard definition known to one skilled in the art.

The weight of the polymers utilized in the present disclosure are preferably at least approximately 1 kilo Dalton (KD), 2 KD, 5 KD, 10 KD, 15 KD, 20 KD, 25 KD, 30 KD, 40 KD, 50 KD, 60 KD, 70 KD, 80 KD, 90 KD, or any value therebetween or greater.

Some examples of polymers or blocks of polymers that may be included in certain embodiments include, but are not limited to, polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polyurethane (PU), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), and any combination of these or others.

Polymers of various degrees of polymerization are also included in the present disclosure. As one of skill in the art would readily appreciate, the degree of polymerization generally refers to the number of repeat units or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the molecular weight of a polymer. Thus, the degree of polymerization is equal to the total molecular weight of the polymer divided by the total molecular weight of the repeating unit or segment. Polymers with different total molecular weights but identical composition may exhibit different physical properties. Generally, a greater degree of polymerization correlates with a greater melting temperature and greater mechanical strength.

In certain embodiments, the polymer can include a multiphase large molecular chain polymer. In some embodiments the multiphase large molecular chain polymer includes one or more arene-containing linear side chains, non-arene-containing linear side chains, saturated linear side chains, unsaturated linear side chains, and/or flexible hydrocarbon linear side chains.

In certain embodiments, the exchange polymer electrolytes can include a wide variety of anion-conducting groups so long as they are such groups that the material can display sufficient anion conductivity and moisture transfer properties. Such anion-conducting groups include an ammonium group optionally substituted with an alkyl group have 1 to 10 carbon atoms; a pyridinium group having a methyl group or an ethyl group bounded to the nitrogen atom or a pyridyl group that has formed a salt with an acid; an imidazolium group having a methyl group or an ethyl group bonded to the nitrogen atom or an imidazolyl group that has formed a salt with an acid; a phosphonium group optionally substituted with a methyl group or an ethyl group or the like.

As to the position of introduction of the anion-conducting groups into polymer block (A), there is no particular restriction, and they can be introduced either into the aromatic vinyl units or into other monomer units.

The amount of the anion-conducting group introduced can be selected depending upon the application purpose, but usually, in order to display sufficient ion conductivity for use as a polymer exchange electrolyte, the amount is preferably sufficient such that the ion exchange capacity of the block polymer is 0.3 to 4 milliequivalents/g. In certain embodiments, introduction of larger amounts can result in low mechanical strength and/or low long term durability.

Introduction of an anion-conducting group into the resulting block copolymer can be conducted by a known method. For example, the obtained block copolymer can be chloromethylated, and then reacted with an amine or a phosphine. Optionally, the chloride ions can be replaced with hydroxide ions or other acid anions. A wide variety of chloromethylation methods known in the art can be used. For example, a method including adding a chloromethylating agent and a catalyst into a solution or suspension of the block polymer in an organic solvent to chloromethylate the block copolymer can be used. A wide variety of organic solvents including, for example, halogenated hydrocarbons (e.g., chloroform or dichloroethane) can be used. Chloromethylating agents including, for example, chloromethyl ether and/or hydrochloric acid-paraformaldehyde can be used, and catalysts including, for example, tin chloride and/or zinc chloride can be used.

A wide variety of methods for reacting an amine or a phosphine with a chloromethylated block polymer can be used. For example, a method including adding an amine or phosphine (e.g., as a solution in an organic solvent) to a solution or suspension of a chloromethylated block copolymer in an organic solvent, or a material formed form the solution or suspension, can be used. A wide variety of organic solvents can be used for preparing the solution or suspension including, for example, methanol, ethanol, acetone, and/or acetonitrile. A wide variety of amines can be used including, for example, ammonia, primary amines (e.g., methyl amine), secondary amines (e.g., dimethyl amine), and combinations thereof can be used to obtain a weakly basic anion exchange polymer; tertiary amines (e.g., trimethyl amine, triethyl amine, dimethylethanol amine, methyl diethanol amine, and/or triethanol amine) can be used to obtain a strongly basic anion exchange membrane; and diamines or polyamines (e.g., ethylene diamine or tetramethyl diaminopropane) can be used to obtain an anion exchange membrane having ion exchange groups bonded to one another.

A chloride ion can be introduced as an anion-conducting group that can optionally be converted to a hydroxide ion or another acid anion if desired. A wide variety of methods for converting the chloride ion to another ion can be used. For example, a chloride ion can be converted to a hydroxide ion conducting group by immersing a chloride ion-containing block copolymer into an aqueous solution of sodium hydroxide or potassium hydroxide.

The ion exchange capacity of an anion-conducting copolymer can be measured using a wide variety of analytical methods known in the art including, for example, titration methods, infrared spectroscopic analysis, proton nuclear magnetic resonance (1H NMR) spectroscopy, elemental analysis, or combinations thereof.

The cationic electrode has at least a first major surface and a second major surface. The first major surface of the cationic electrode is adjacent at least a portion of the second major surface of the cationic exchange polymer electrolyte layer.

The anionic electrode has at least a first major surface and a second major surface. The first major surface of the anionic electrode is adjacent at least a portion of the second major surface of the anionic exchange polymer electrolyte layer.

The electrodes (i.e., cathode and anode) in the devices, methods, and systems disclosed herein can have metal or otherwise electrically conductive surfaces. In certain embodiments, the anode, the cathode, or both can be a porous metal or carbon plate. In certain embodiments, the electrodes can have high surface area and can optionally be porous. In preferred embodiments, the electrodes include composites such as, for example, an anode including an anionic exchange polymer electrolyte with a plurality of particles, and a cathode including a cationic exchange polymer electrolyte with a plurality of particles. See U.S. Pat. No. 5,136,474 (Sarangapani et al.) for additional examples of composite electrodes.

In certain embodiments, the particles can be applied to the face of an electrode by casting, vapor depositing, spraying, or any other process that allow for application, preferably in a uniform manner. Once applied to the face of the electrode, the particles can increase the functional surface area, resulting in an increase in capacitance of the capacitor. In certain embodiments, the surface area can be increased by at least 100 times, at least 500 times, at least 1,000 times, at least 10,000 times, at least 50,000 times, at least 100,000 times, or even more.

A wide variety of anionic exchange polymer electrolytes and cationic exchange polymer electrolytes can be used for composite electrodes. Exemplary anionic exchange polymer electrolytes and exemplary cationic exchange polymer electrolytes are described herein above. Additional exemplary polymer electrolytes useful for composite electrodes are described in U.S. Pat. No. 7,990,679 (Ehrenberg et al.); and U.S. Patent Application Publication No. 2012/0320497 (Ehrenberg).

The polymer electrolytes can act to hold the particles of the electrode together. In certain embodiments, the polymer electrolytes can act as an adhesive to bind a conductive particle electrode to the interior face of an outer layer (e.g. metal foil). The polymer electrolytes can also serve a dielectric function by modulating the electric field at the surface of the particles, and increasing the charge capacity of the electrode and the cell. The polymer electrolytes can also fill a void between the particles, preventing any voids from creating paths to the dielectric layer.

A wide variety of particles can be used for composite electrodes. In certain embodiments, the particles are conductive. Useful particles can include, for example, carbon, a metal, a metal oxide, or other metal-containing particles. Useful metals include, for example, nickel, titanium (e.g., titanium dioxide), lead, lithium, silver, and copper. Other electrically conductive particles include phthalocyanine oligomers and other electrically conductive materials (e.g., organic molecules and polymers). In certain preferred embodiments, the nanoparticles include carbon. In certain embodiments the particles are particles having high surface area (e.g., greater than 1000 meters$^2$/g and in some embodiments greater than 2000 meters$^2$/g) such as nanoparticles. In preferred embodiments, the nanoparticles are carbon particles (e.g., graphite).

In certain embodiments, nanoparticles can be used to increase the surface area of the composite electrode. The three-dimensional surface of the nanoparticles can allow for increased functional surface area upon which the charge may build the electric field within each electrode layer of the energy storage device. The nanoparticles utilized by certain exemplary embodiments may be of any shape or form, preferably spheroidal, and can be round, oval, irregular, pyramidal, conical, rhomboidal, or any variation of these or other shapes. In certain embodiments, the average diameter of the nanoparticles is at most 150 nm, at most 125 nm, at most 100 nm, at most 75 nm, at most 50 nm, at most 25 nm, at most 10 nm, at most 5 nm, at most 2.5 nm, at most 2 nm, at most 1 nm, or even less. For nonspherical particles, the diameter is taken to be the largest dimension of the particle.

In certain embodiments, graphite composite electrodes can be constructed by mixing graphite (e.g., conductive graphite powders), which are commercially available with surface areas far exceeding 2400 meter$^2$ per gram, with the corresponding polymer electrolyte. The term graphite is intended to include graphene, a flat mono-layer of carbon atoms. Although the structure of the composite electrodes may reduce the effective surface area of the graphite, it can produce a balance between ionic and electronic conductive structures. It is expected that 20-40% of the particle surface area can still be available for redox plating and electrostatic charging. At modest graphite loadings per centimeter$^2$ of composite electrode, surface area enhancements of $10^4$ are expected.

In certain embodiments, the loading of conductive graphite powders in the graphite composite electrodes is high enough to achieve electrical conductivity, but not so high as to impede the dielectric access of ions to the conductive surfaces. In certain embodiments, graphite composite electrodes can include 17 to 50 volume percent conductive graphite powders.

Certain other embodiments disclosed herein include flat sheets of composite electrode to form energy storage device cells. The flat sheets of very thin cells forming the energy storage device can allow for versatility of shape and size of the device. In addition, the flat cells can allow for the use of a prismatic shape, or other shapes for the devices, to generate energy storage devices that are efficient in space and volume.

In particular exemplary embodiments, the thin, flat sheets can be laminated together to form a cell of the energy storage device. The particular processes of forming the materials and assembling the cells can allow for high speed automation, thus reducing the overall cost of manufacturing the devices. In certain exemplary embodiments, the sheet material devices can be stacked in a prismatic, or other arrangement, that can allow for generation of energy storage devices having the ability to cycle and re-cycle with good power delivery.

The anionic electrode cover layer, preferably including an insulating material, is configured to provide a gas tight seal around the anionic exchange polymer electrolyte layer and the anionic electrode to exposed portions of the second major surface of the separation dielectric layer. The anionic electrode cover layer also includes a second optional vacuum port and a second electrical contact in electrical communication with the anionic electrode. Optionally, the second vacuum port can include, for example, an electrically conductive metal, in which case, the second vacuum port can also be the second electrical contact.

The cationic electrode cover layer, preferably including an insulating material, is configured to provide a gas tight seal around the cationic exchange polymer electrolyte layer and the cationic electrode to exposed portions of the first major surface of the separation dielectric layer. The cationic electrode cover layer also includes a first optional vacuum port and a first electrical contact in electrical communication with the cationic electrode. Optionally, the first vacuum port can include, for example, an electrically conductive metal, in which case, the first vacuum port can also be the first electrical contact.

The dielectric and electrode layers, prior to assembly, can be impregnated with an oil (e.g., a non-electrically conductive dielectric oil). The oil can be chosen from a group of small molecule oils that are known to have very high breakdown voltages and bulk resistances, along with modest dielectric constants. Such oils are typically used in high voltage transformers and switches as dielectric insulation to prevent arcing. One such example is polydimethylsiloxane such as that available under the trade designation CLEARCO STO-50 silicone transformer oil from Clearco Products Co., Inc., Bensalem, Pa. Such an oil impregnated into the electrolyte structure can be absorbed into the charge domains to displace, for example, any residual water, and increase the bulk electrical resistivity and ionic conductivity of the structure (e.g., act as an ion conductivity enhancer) and help to protect the structure from arcing or other breakdown phenomena. The oil can also act as a media for the transport of ions to the electrodes for oxidation or reduction.

In another aspect, the present disclosure provides a method of placing an energy storage device in an ionized state. In one embodiment, the method includes: providing an energy storage device as described herein; applying a negative potential to the first electrical contact of the cationic electrode cover layer effective to cause at least a portion (and preferably substantially all) of the electrostatically bound positive ions (e.g., hydrogen ions, $H^+$) to migrate to the cationic electrode and be reduced to a neutral species (e.g., molecular hydrogen, $H_2$); applying a positive potential to the second electrical contact of the anionic electrode cover layer effective to cause at least a portion (and preferably substantially all) of the electrostatically bound negative ions (e.g., chloride ions, $Cl^-$) to migrate to the anionic electrode and be oxidized to a neutral species (e.g., molecular chlorine, $Cl_2$); optionally applying at least a partial vacuum (and preferably a vacuum) to the first optional vacuum port of the cationic electrode cover layer effective to remove at least a portion (and preferably substantially all) of the reduced neutral species; and optionally applying at least a partial vacuum (and preferably a vacuum) to the second optional vacuum port of the anionic electrode cover layer effective to remove at least a portion (and preferably substantially all) of the oxidized neutral species.

In another aspect, the present disclosure provides energy storage devices in an ionized state. In certain embodiments, energy storage devices as disclosed herein can be placed in an ionized state by the methods disclosed herein. In certain embodiments, the energy storage device in the ionized state is in an uncharged state. In certain embodiments, the energy storage device in the ionized state is in an electrically neutral state having no potential across the first and second electrical contacts. In certain embodiments, the energy storage device has a high dielectric constant. In certain embodiments, the anionic exchange polymer electrolyte layer and the cationic exchange polymer electrolyte layer of the energy storage device in the ionized state are under compressive strain.

In another aspect, the present disclosure also provides methods of storing energy using an energy storage device in an ionized state as described herein. In certain embodiments, the method includes applying a positive potential to the first electrical contact of the cationic electrode cover layer and negative potential to the second electrical contact of the anionic electrode cover layer under conditions effective to electrostatically store charge on the device. In certain embodiments, the storage of charge on the device is sufficient to at least partially relieve (and preferably fully relieve) compressive strain between the anionic exchange polymer electrolyte layer and the cationic exchange polymer electrolyte layer. As the dielectric relaxes from compression to tension, it will store electrical energy through the relationship of force×distance.

In another aspect, the present disclosure provides a method of storing energy. In one embodiment, the method includes: providing an energy storage device as disclosed herein; applying a negative potential to the first electrical contact of the cationic electrode cover layer effective to cause substantially all of the electrostatically bound positive ions to migrate to the cationic electrode and be reduced to a neutral species; applying a positive potential to the second electrical contact of the anionic electrode cover layer effective to cause substantially all of the electrostatically bound negative ions to migrate to the anionic electrode and be oxidized to a neutral species; optionally applying at least a partial vacuum to the first optional vacuum port of the cationic electrode cover layer effective to remove at least a portion of the reduced neutral species; and optionally applying at least a partial vacuum to the second optional vacuum port of the anionic electrode cover layer effective to remove at least a portion of the oxidized neutral species; and further applying a positive potential to the first electrical contact of the cationic electrode cover layer and negative potential to the second electrical contact of the anionic electrode cover layer under conditions effective to electrostatically store charge on the device.

In another embodiment, the present disclosure provides a method of preparing an ionic solid dielectric material. In one embodiment, the method includes: providing an anionic exchange polymer electrolyte solution including at least one polymer having a plurality of chemically bound positive ions and a plurality of electrostatically bound negative ions (e.g., chloride ions); and providing a cationic exchange polymer electrolyte solution including at least one polymer having a plurality of chemically bound negative ions and a plurality of electrostatically bound positive ions (e.g., hydrogen ions). A wide variety of suitable anionic exchange polymer electrolytes and cationic exchange polymer electrolytes are described herein.

The method further includes combining the anionic exchange polymer electrolyte solution and the cationic exchange polymer electrolyte solution under conditions effective to allow at least a portion of the plurality of chemically bound positive ions of the anionic exchange polymer electrolyte to ionically associate with at least a portion of the plurality of chemically bound negative ions of the cationic exchange polymer electrolyte and form the ionic solid dielectric material. For example, the ionic solid dielectric material can be prepared by mixing a cationic exchange polymer electrolyte and an anionic exchange polymer electrolyte in solution. The mixing can be done at a convenient temperature (e.g., room temperature to 50° C.). As they are mixed, the opposite polarity of the molecules can attract each other. As they become ionically associated, the mobile ions associated with the molecules (e.g., $H^+$ for the cationic and CF for the anionic) are freed to form a neutral species (e.g., hydrochloric acid, HCl).

In certain embodiments, the formed ionic solid dielectric material can be cast as a film. In some embodiments, the film can be cast as multiple layers. For example, each layer can be allowed to reach its gel point before casting a subsequent layer, and films of varying thickness can be created by iterating the casting process. In preferred embodiments, the casting process is done under controlled humidity conditions (e.g., under a hood). The casting can be done at a convenient temperature (e.g., room temperature to 50° C.).

In certain embodiments, the formed ionic solid dielectric material can be cast as a film on a substrate (e.g., a release substrate or a conductive plate), conveniently on a vacuum table, for example. For example, the casting can be done on a non-stick release liner (e.g., a silicone coated polyethylene terephthalate (PET) film) or onto the capacitor conduction plate itself. The capacitor plate can be solid or porous with compositions ranging from metal to porous carbon. For example, the conductive plate can be selected from the group consisting of a metal conductive plate, a carbon conductive plate, a porous metal conductive plate, a porous carbon conductive plate, and a carbon composite electrode.

The electrolyte layer can be washed with deionized, distilled water to remove at least part (and substantially all) the HCl, and then dried. In certain embodiments, multiple washing cycles may be used to allow the mobile ions to diffuse from the film into the wash liquid. Films can be dried by a wide variety of suitable methods including, for example, air drying and drying in a vacuum oven (e.g., at 40-45° C.). After drying, a plastic ionic solid is formed. Within the layer, the molecules are ionically attracted to each other by their covalently bound charges. This ionic solid is can then be placed between two plates as the dielectric for the capacitor.

In certain embodiments, the film of the formed ionic solid dielectric material further can include at least a portion of the negative ions that were electrostatically bound to the anionic exchange polymer electrolyte, and at least a portion of the positive ions that were electrostatically bound to the cationic exchange polymer electrolyte. In such embodiments, at least a portion of the negative and/or positive ions from the ionic solid dielectric film can optionally be at least partially removed (and in preferred embodiments substantially entirely removed) by washing the film with, for example, deionized, distilled water, to remove at least part (and substantially all) the HCl, and then dried. In certain embodiments, multiple washing cycles may be used to allow the mobile ions to diffuse from the film into the wash liquid. Films can be dried by a wide variety of suitable methods including, for example, air drying and drying in a vacuum oven (e.g., at 40-45° C.). After drying, a plastic ionic solid is formed. Within the layer, the molecules are ionically attracted to each other by their covalently bound charges. This ionic solid is can then be placed between two plates as the dielectric for the capacitor.

In another aspect, the present disclosure provides an ionic solid dielectric material. In one embodiment, the ionic solid dielectric material includes: at least one polymer having a plurality of chemically bound positive ions; and at least one polymer having a plurality of chemically bound negative ions, wherein at least a portion of the plurality of chemically bound positive ions ionically associate with at least a portion of the plurality of chemically bound negative ions. In certain embodiments, the present disclosure provides ionic solid dielectric materials prepared by methods disclosed herein.

In another aspect, the present disclosure provides an energy storage device that includes: a first conductive plate; a second conductive plate; and at least one ionic solid dielectric layer between the first conductive plate and the second conductive plate. In some embodiments, the at least one ionic solid dielectric layer includes an ionic solid dielectric material as described herein. A wide variety of suitable conductive plates (e.g., electrodes) are described herein. In some embodiments, at least one conductive plate includes a metal or carbon conductive plate such as a porous metal or carbon plate (e.g., a carbon composite electrode). For example, the conductive plate can be selected from the group consisting of a metal conductive plate, a carbon conductive plate, a porous metal conductive plate, a porous carbon conductive plate, and a carbon composite electrode. In certain embodiments, the device can optionally include a non-electrically conductive dielectric oil as described herein (e.g. polydimethylsiloxane), for example, at least partially within the at least one ionic solid dielectric layer. In certain embodiments, the device is configured to be charged to store energy in an electrostatic mode.

In another aspect, the present disclosure provides a method of storing energy. In certain embodiments, the method includes: providing an energy storage device that includes a first conductive plate, a second conductive plate, and at least one ionic solid dielectric layer between the first conductive plate and the second conductive plate; and applying a field negatively polarized with respect to the first conductive plate and positively polarized with respect to the second conductive plate under conditions effective to electrostatically store charge on the device. In some embodiments, conditions effective to store charge on the device include applying a field having a potential of at least 1 volt direct current, and in certain embodiments a potential of greater than 1 volt direct current. In certain embodiments, conditions effective to store charge on the device include applying a field having a potential of no greater than the breakdown voltage of the ionic solid dielectric layer.

In another aspect, the present disclosure provides systems for storing and discharging energy that include one or more energy storage devices as disclosed herein; and a means for applying a field negatively polarized with respect to the first conductive plate and positively polarized with respect to the second conductive plate under conditions effective to electrostatically store charge on the device (e.g., using a current source such as a direct current source, which can optionally be a continuous current source); and a means for discharging energy from electrostatically stored charge on the device (e.g., using a resistive and/or mechanical drain, such as heaters and/or motors).

Multiple cells can be connected in parallel, for example, by a bus accessing the tabs on each cell. Stacking these capacitors cells in a prismatic arrangement can allow for the creation of an energy storage device with superior specific energy, energy density, and specific power that retains typical capacitor cycling and round trip energy efficiency characteristics. In addition, packaging the cells in parallel can divide cell resistance to create a low equivalent series resistance cell pack. The charge levels of the cell pack can be monitored to reduce or prevent current inrush or discharge, which can reduce or prevent overheating of the assembly. Appropriate cooling methods can optionally be used for cell packs. Individual cells can be fused so as to reduce the chance of a pack meltdown in the event of shorts in one or more individual cells.

The present invention is illustrated by the following examples. It is to be understood that the particular examples, materials, amounts, and procedures are to be interpreted broadly in accordance with the scope and spirit of the invention as set forth herein.

EXAMPLES

Example 1

Figure 3:
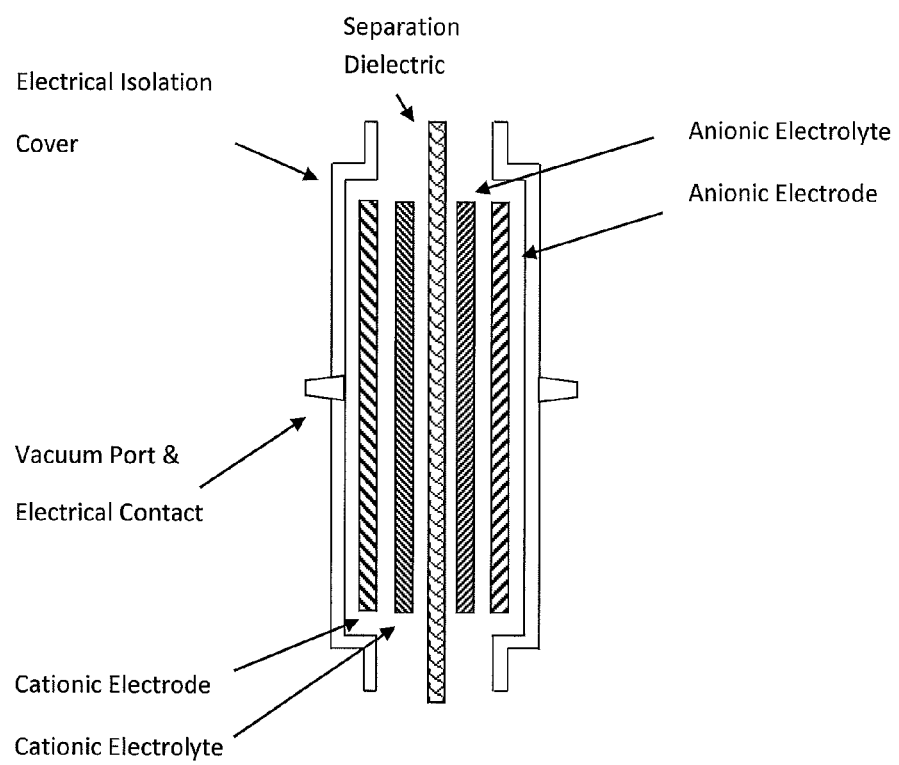
FIG. 3 is a schematic illustration of components of an embodiment of an energy storage device as disclosed herein.

The following is a description of one embodiment of an energy storage cell configuration. This configuration uses a single pair of dielectric electrolyte layers consisting of a single anionic electrolyte layer and single cationic electrolyte layer separated by a third dielectric layer which is not an electrolyte. The components of this configuration are shown in FIG. 3. Each cell consists of 9 components: the three dielectric layers, two electrodes, two electrically insulating cover layers that seal out external gases, and two metal vacuum ports that also function as the electrical contacts to the cell. The metal vacuum ports are in physical and electrical contact with the dielectric electrodes.

Figure 4:
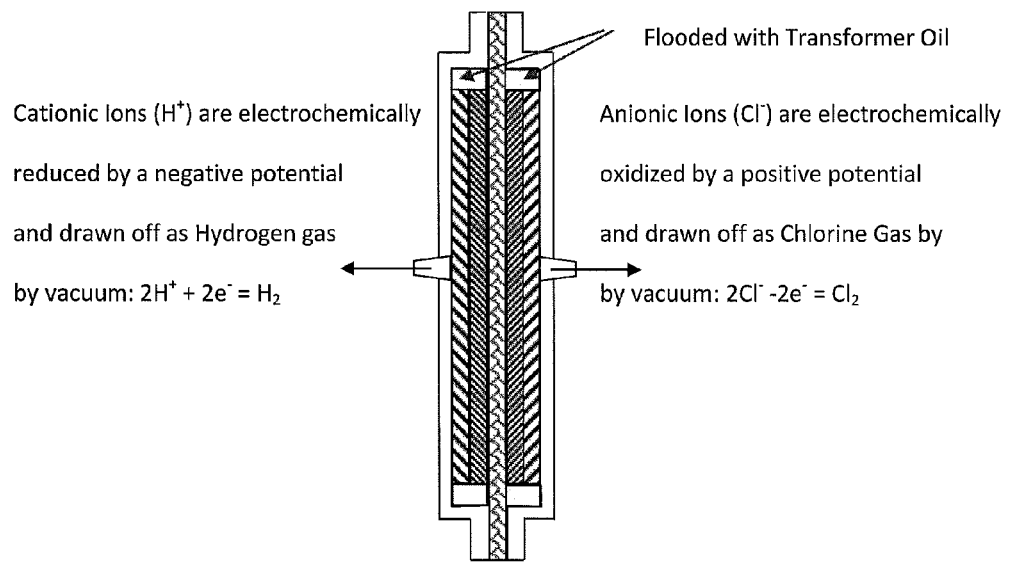
FIG. 4 is a schematic illustration of an embodiment of an assembled, unionized, energy storage device as disclosed herein. The assembly can be flooded on both sides with insulating oil to act as transport media for the ions, and to increase the electronic resistance of the assembly, protecting it from arcing and other breakdown phenomena.

The ions within the anionic layer are chloride ions ($Cl^-$). The ions with the cationic layer are hydrogen ions (i.e., protons, $H^+$). A potential is applied that causes the free exchange ions within the electrolyte to be pulled from their covalently bound counter ions. A negative potential is applied to the cationic electrode through the metal vacuum contact. A positive potential is applied to the anionic electrode through its metal vacuum contact. The ions are pulled to the electrodes and are electrochemically oxidized and reduced: $Cl^- \rightarrow Cl^0$, $H^+ \rightarrow H^0$. These monatomic atoms are unstable and will bind to other similar atoms to for form a gas: $Cl_2$, and $H_2$. Simultaneously with the application of potential, the cell is placed under vacuum to facilitate the removal of the gases. This is shown in FIG. 4.

As the potential is increased more ions will be drawn to electrodes and oxidized and reduced. This process can continue until either there are no more free exchange ions left within the electrolyte dielectrics or until a set potential is achieved and the evolution of the gasses cease. In the latter case, this means that there are no more free exchange ions available at that potential.

Figure 5:
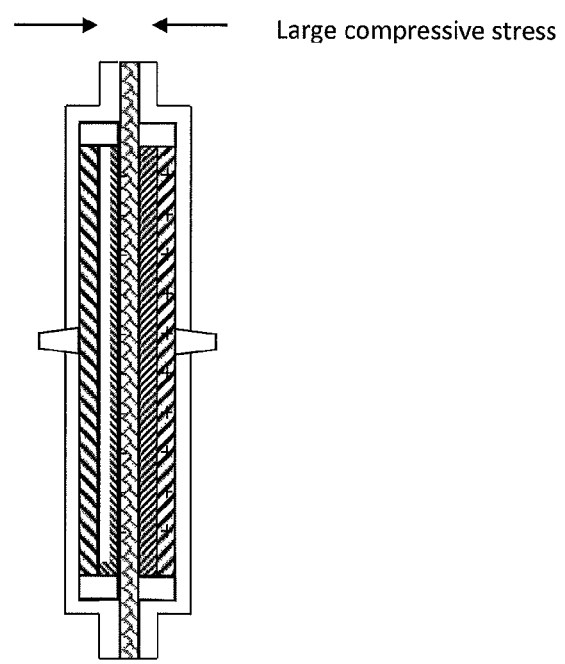
FIG. 5 is a schematic illustration of an embodiment of an assembled energy storage device as disclosed herein in the ionized state. Electrolyte layers are attracted to each other across the barrier placing the system in compressive strain.

The cell is now in an ionized state as shown in FIG. 5. However, it is in an uncharged state and is electrically neutral. The cell electrodes have no potential as all the charge taken from or placed onto them as used to electrochemically create $Cl_2$ and $H_2$ gasses.

The cell will have a very high dielectric constant as there are opposite polarity matching charges within the cell layers. These charges are separated by the middle non-electrolyte dielectric layer. These opposite polarity charges will establish a strong attractive electrostatic field between them. This electrostatic field causes the electrolyte material layers to undergo compressive strain as the charges move closer to each other. This is shown in FIG. 5. Thus, as the dielectric polarizes, the dielectric constant increases and the dielectric loss of the structure is reduced.

Figure 6:
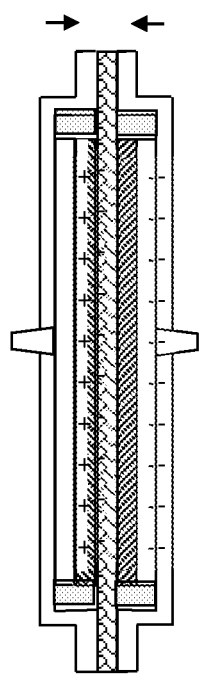
FIG. 6 is a schematic illustration of an embodiment of an assembled and ionized storage device as disclosed herein with charge applied to the electrodes.

Imposing a voltage that is opposite in polarity to that which ionized the cell will store energy. This polarity voltage will not cause any electrochemical activity within the cell but will establish an electrostatic field that is counter to the existing field within the electrolyte layers. The energy results from attracting the ionized charges within the adjacent electrolyte and relieving the compressive strain. This is shown in FIG. 6. Charge on the electrodes attracts the charge within the adjacent electrolyte dielectric, opposing the ionized electrostatic field and reducing the compressive strain.

The voltage required to ionize the structure shown in FIG. 6 is a function of the charge density of the electrolyte. A charge density electrolyte of 2 MEQ per gram will require several thousand volts to fully ionize. To fully relieve the compressive strain the voltage on the electrodes must be equal to the ionization voltage.

Given the high dielectric constant of the structure and the high voltages necessary to ionize it, the amount of energy the cell will store is very large. The energy storage is proportional to the square of the electrode voltage.

Example 2

An exemplary preparation of a polycation and polyanion complex ionic solid dielectic material is described in this example. In this example, there is a 1:1 stoichiometry between oppositely charged synthetic polyelectrolytes carrying strong ionic groups. Highly sulfonated (75 mole % sulfonation) styrene-ethylene/butylenes-styrene block copolymer (SEBS) was used as the polyanion, and triethylammonium (76 mole % ammonium) SEBS chloride was used as the polycation.

The complex solution was prepared by mixing 4 g of sulfonated SEBS polymer/THF/DEC/n-propanol solution (75 mole %, 18.1% solid) and 170 g of triethylammonium SEBS chloride polymer/ethanol/chloroform solution (76 mole %, 2.4% solid) under rapid stirring at 40-45° C. Large colloidal aggregates formed after mixing. Continuous stirring of the complex solution at the 40-45° C. for an extended period time redissolved the large colloidal aggregates yielding a clear solution. Thin films of the polyelectrolyte complex were prepared by multilayer-casting using wire wound rods. The dried thin film was first soaked in DI water for approximately 2 to 3 hours, washed with DI water several times, and then air dried.

Example 3

Figure 7:
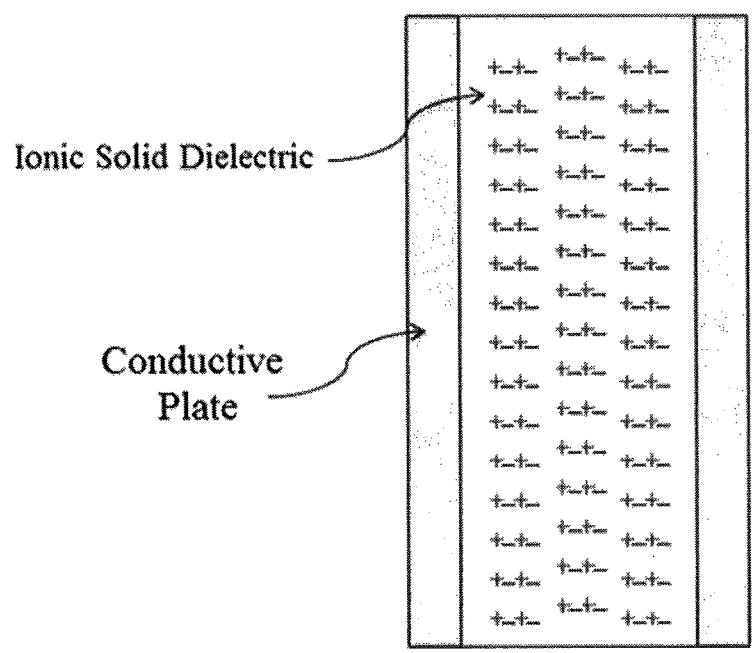
FIG. 7 is a schematic illustration of an embodiment of an energy storage device having a ionic solid dielectric layer.

The following is a description of one embodiment of an energy storage cell configuration as illustrated in FIG. 7. This configuration uses a single dielectric layer of ionic solid dielectric material positioned between two conductive plates. The ionic solid dielectric material can be prepared, for example, as described in Example 2. This ionic solid is can then be placed between two plates as the dielectric for the capacitor.

Figure 8:
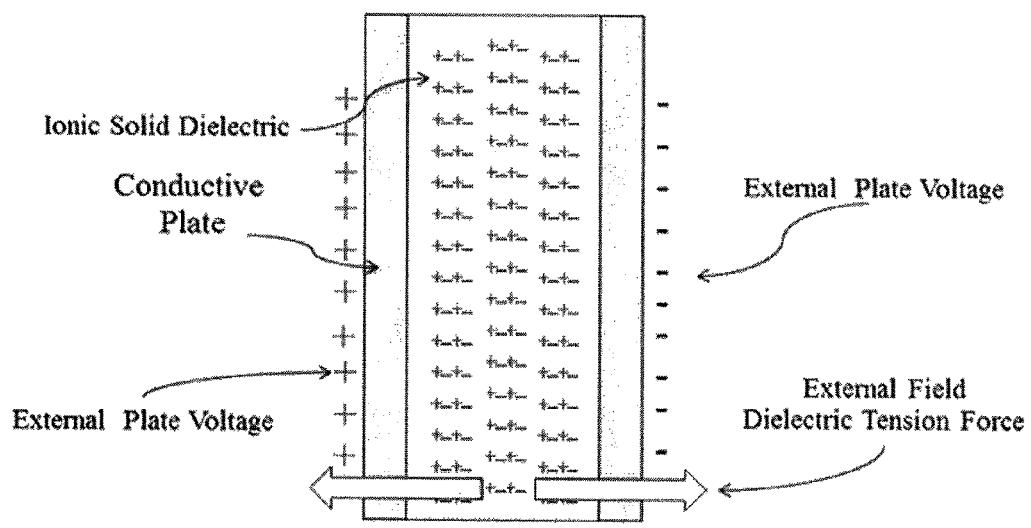
FIG. 8 is a schematic illustration of an embodiment of an energy storage device having a ionic solid dielectric layer with charge applied to the conductive plates.

When an external potential is applied to charge the plates, an internal field develops as illustrated in FIG. 8. The internal field applies force to the molecules and places them in tension. The force is applied to every molecule in the dielectric that has covalently bound fixed charges attached. As the molecules separate, energy is stored in the capacitor through the relationship of force×distance.

Example 4

Figure 9:
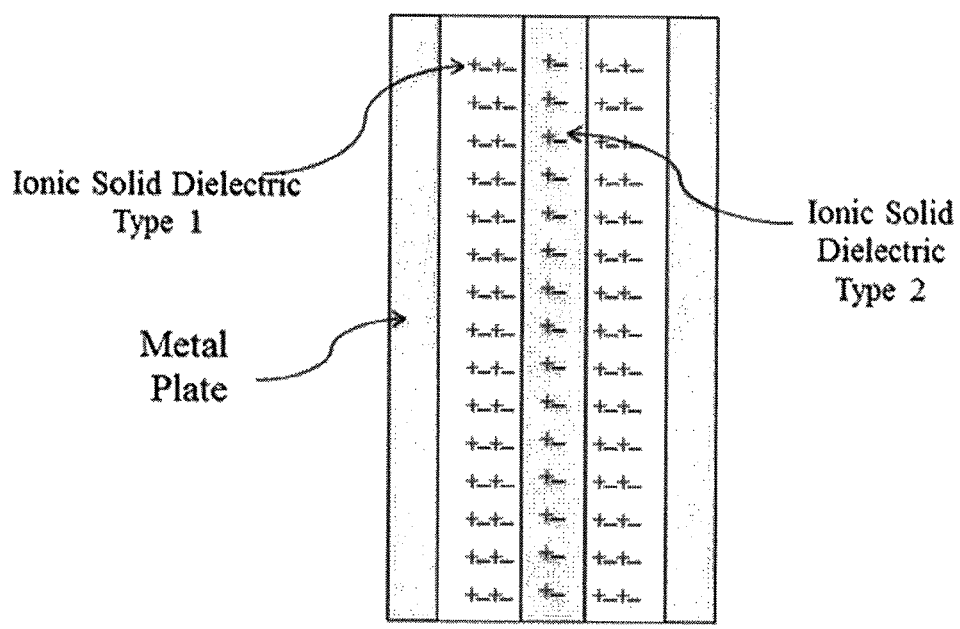
FIG. 9 is a schematic illustration of an embodiment of an energy storage device having a plurality of ionic solid dielectric layers.

The following is a description of one embodiment of an energy storage cell configuration as illustrated in FIG. 9. This configuration uses multiple dielectric layers of ionic solid dielectric material positioned between two conductive plates. This example illustrates the use of different ionic solid dielectric materials in the different dielectric layers. These layers are shown in FIG. 9 are illustrate dielectric layers adjacent the conductive plates that include a first ionic solid dielectric material (i.e., Type 1 ionic solid dielectric material), and a dielectric layer between the first two dielectric layers that includes a second ionic solid dielectric material (i.e., Type 2 ionic solid dielectric material). Although not illustrated in FIG. 9, energy storage devices can be created that include more or less dielectric layers. Further, although not illustrated in FIG. 9, energy storage devices can be created that include more different types of ionic solid dielectric materials (e.g., up to as many different types of ionic solid dielectric materials as there are dielectric layers).

The ionic solid dielectric materials and resulting layers can differ in physical, chemical, structural (e.g., nanostructure), and/or electrical properties (e.g., charge density). Structures such as those illustrated in FIG. 9 can be advantageous for increasing the bulk resistance and dielectric strength of the dielectric, which can preferably extend the energy storage capability of the device by being capable of sustaining higher voltages.

Figure 10:
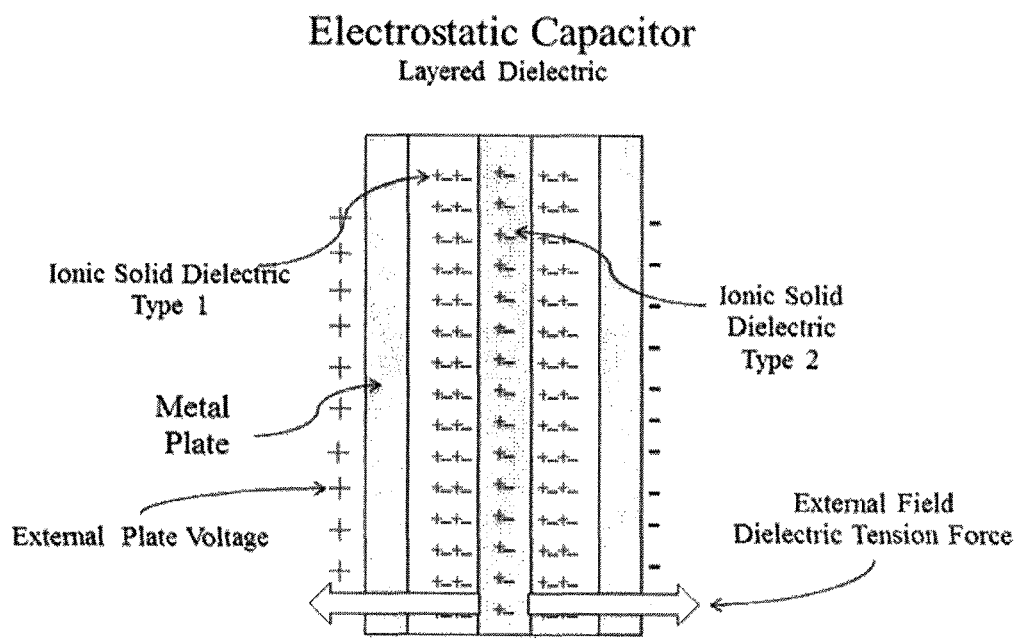
FIG. 10 is a schematic illustration of an embodiment of an energy storage device having a plurality of ionic solid dielectric layers with charge applied to the conductive plates.

When an external potential is applied to charge the plates, an internal field develops as illustrated in FIG. 10. The internal field applies force to the molecules and places them in tension. The force is applied to every molecule in the dielectric that has covalently bound fixed charges attached. As the molecules separate, energy is stored in the capacitor through the relationship of force×distance.

The materials and structures shown in these examples can be combined in various ways to produce hybrid energy storage devices combining ionic solid dielectric layers and polarized layers. In certain embodiments, such hybrid energy storage devices have the capability of increasing the performance of the resulting capacitors.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described; for variations obvious to one skilled in the art will be included within the invention defined by the claims.

What is claimed is:

1. An ionic solid dielectric material comprising:
   at least one polymer having a plurality of chemically bound positive ions; and
   at least one polymer having a plurality of chemically bound negative ions,
   wherein at least a portion of the plurality of chemically bound positive ions are ionically associated with at least a portion of the plurality of chemically bound negative ions.

2. An energy storage device comprising:
   a first conductive plate;
   a second conductive plate; and
   at least one ionic solid dielectric layer comprising at least one ionic solid dielectric material according to claim 1 between the first conductive plate and the second conductive plate.

3. The device of claim 2 wherein at least one conductive plate is selected from the group consisting of a metal conductive plate, a carbon conductive plate, a porous metal conductive plate, a porous carbon conductive plate, and a carbon composite electrode.

4. The energy storage device of claim 2 wherein one or both of the first conductive plate and the second conductive plate comprise graphite and/or graphene.

5. The device of claim 2 further comprising a non-electrically conductive dielectric oil within the at least one ionic solid dielectric layer.

6. The device of claim 5 wherein the non-electrically conductive dielectric oil comprises polydimethylsiloxane.

7. A method of storing energy, the method comprising:
   providing an energy storage device according to claim 2; and
   applying a field negatively polarized with respect to the first conductive plate and positively polarized with respect to the second conductive plate under conditions effective to electrostatically store charge on the device.

8. The method of claim 7 wherein conditions effective to store charge on the device comprise applying a field having a potential of at least 1 volt direct current, but no greater than the breakdown voltage of the ionic solid dielectric layer.

9. A system for storing and discharging energy, the system comprising:
   one or more energy storage devices according to claim 2;
   a means for applying a field negatively polarized with respect to the first conductive plate and positively polarized with respect to the second conductive plate under conditions effective to electrostatically store charge on the device; and
   a means for discharging energy from electrostatically stored charge on the device.

10. A cell or cell pack comprising one or more energy storage devices according to claim 2.

11. A method of preparing an ionic solid dielectric material comprising:
    providing an anionic exchange polymer electrolyte solution comprising at least one polymer having a plurality of chemically bound positive ions and a plurality of electrostatically bound negative ions;
    providing a cationic exchange polymer electrolyte solution comprising at least one polymer having a plurality of chemically bound negative ions and a plurality of electrostatically bound positive ions;
    combining the anionic exchange polymer electrolyte solution and the cationic exchange polymer electrolyte solution under conditions effective to allow at least a portion of the plurality of chemically bound positive ions of the anionic exchange polymer electrolyte to ionically associate with at least a portion of the plurality of chemically bound negative ions of the cationic exchange polymer electrolyte and form the ionic solid dielectric material.

12. The method of claim 11 further comprising casting the formed ionic solid dielectric material as a film on a substrate.

13. The method of claim 12 wherein the substrate is a release substrate or a conductive plate.

14. The method of claim 12 wherein the film of the formed ionic solid dielectric material further comprises at least a portion of the negative ions that were electrostatically bound to the anionic exchange polymer electrolyte, and at least a portion of the positive ions that were electrostatically bound to the cationic exchange polymer electrolyte.

15. The method of claim 14 further comprising removing at least a portion of the negative and/or positive ions from the ionic solid dielectric film by washing the film with deionized, distilled water.

16. The method of claim 11 wherein the electrostatically bound negative ions of the anionic exchange polymer electrolyte comprise $Cl^-$ ions; and the electrostatically bound positive ions of the cationic exchange polymer electrolyte comprise $H^+$ ions.

* * * * *

UNITED STATES PATENT AND TRADEMARK OFFICE
CERTIFICATE OF CORRECTION

PATENT NO.       : 9,293,269 B2
APPLICATION NO.  : 13/750309
DATED            : March 22, 2016
INVENTOR(S)      : Ehrenberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this
Twenty-eighth Day of June, 2016

Michelle K. Lee
*Director of the United States Patent and Trademark Office*